UNITED STATES PATENT OFFICE.

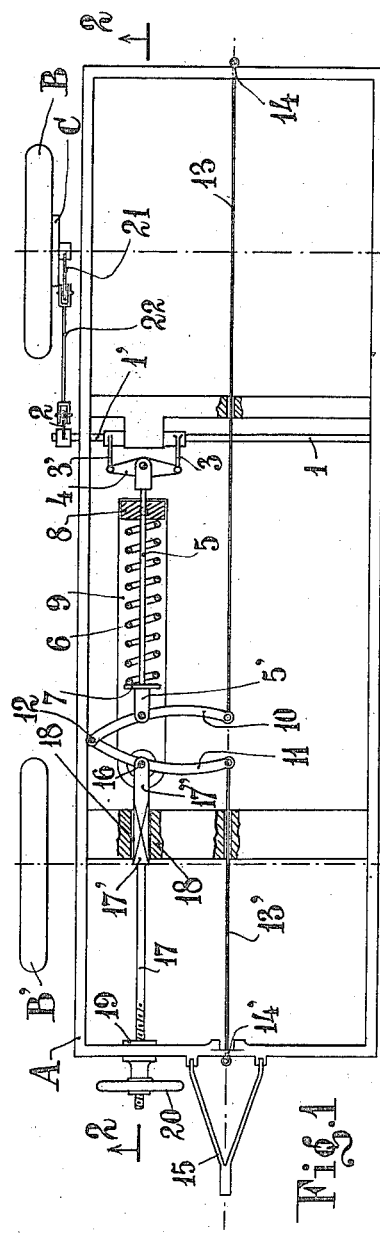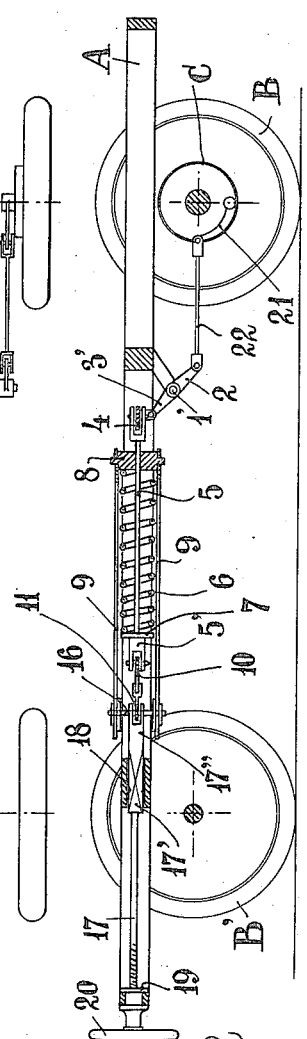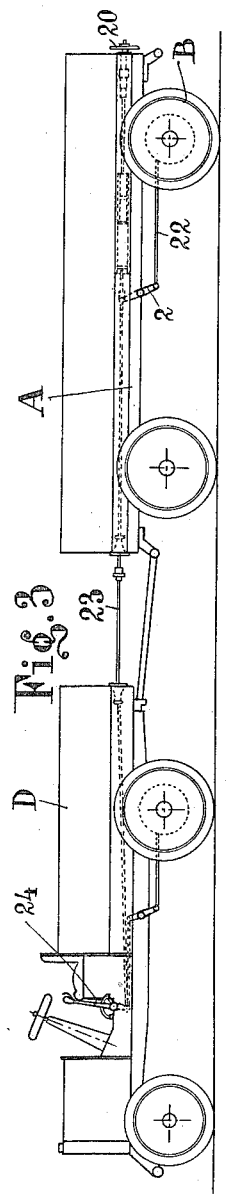

ACHILLE ARATO, OF TURIN, ITALY, ASSIGNOR TO FERRUCCIO BOTTA, OF TURIN, ITALY.

TRAILER BRAKE.

1,424,273. Specification of Letters Patent. Patented Aug. 1, 1922.

Application filed April 27, 1921. Serial No. 465,014.

*To all whom it may concern:*

Be it known that I, ACHILLE ARATO, a subject of the King of Italy, and resident of Turin, Italy, have invented certain new and useful Improvements in Trailer Brakes, of which the following is a specification.

This invention relates to gears for controlling the brakes of trailed cars of road trains and has for its object a device comprising a spring gear which acts on the brakes to hold them in braking position, and a controlling member intended to hold said brakes released as long as said member is tensioned.

Further the gear according to this invention comprises a hand operated device for holding the brakes in released position when desired.

On the annexed drawing is shown by way of example an embodiment of the gear according to this invention. Figure 1 is a diagrammatic plan view, with parts in section, of a trailer provided with the brake gear according to this invention; Figure 2 is a vertical section on 2—2, Figure 1; Figure 3 is an elevation showing the trailer coupled with the tractor, with means for controlling the trailer brakes from said tractor.

As shown by said drawing the trailer comprises a frame A mounted on wheels B and B' by means of axles and springs not shown for sake of clearness; the wheels B are provided with brake drums C, as usually, against which may be applied brake shoes (not shown) which are controlled by levers 21 and ties 22 connected to levers 2 secured on the outer ends of transverse spindles 1—1', these latter being pivoted in the car frame. At their adjacent ends the spindles 1—1' are provided with arms 3—3' pivotally connected to a balancing yoke 4 which is operated by a rod 5 in the manner hereinafter described. Said device is the well known one used for making even and balanced the operation of the brakes of the two wheels.

Said rod 5 is mounted to slide freely in a hole of a transverse part 8 of a frame comprising longitudinal plates 9 pivoted to said part 8 and interconnected at their opposite end by a transverse pin 16. A flange 7 is provided on said rod 5 near its end removed from the part 8 and a spring 6 is wound around it, this spring bearing against said flange 7 and part 8 to move them away from each other.

In a transverse bar 18 of the frame A of the car is provided a square hole and a longitudinal spindle 17 having a square portion 17' is mounted to slide through said hole but prevented from rotating in it. This spindle 17 has its outer end screw-threaded and engaged in a screw-threaded sleeve 19 pivoted in the frame A and operated by a hand wheel 20.

The opposite end of this spindle provides a fork 17" in which is engaged the pin 16 interconnecting the plates 9 and a lever 11 is pivoted on said pin at an intermediate point between its end.

Another lever 10 is pivoted at an intermediate point in a fork 5' of the rod 5 and this lever has one end pivoted to the adjacent end of said lever 11.

Finally the free end of the levers 10—11 are each connected with a tie 13—13' arranged longitudinally in the car and having an end eye 14—14' respectively, which bears against the car frame so that each of them may be drawn out from the car frame with its tie 13—13' but it cannot enter the frame more than is shown on the drawing.

The position of the pivot 16 may be adjusted manually by the operation of the hand wheel 20 and it may be shifted for the hereinafter described purpose, but said pin 16 is stationary during the operation; the position of the several parts of the gear in Figures 1 and 2 is that in which the brakes are in braking position.

In the operation, either of the eyes 14 or 14' is connected with a tie 23 operated by the hand lever 24 controlling the brakes of the tractor D, see Figure 3. The adjustment of the tie 23 and lever 24 must be such that when the trailer brakes are to be released, that is for running, the said tie 23 is tensioned and the eye 14' or 14 connected with it is held spaced from the adjacent portion of the frame A, and the associate tie 13' or 13 is tensioned.

When a pull is thus exerted on the tie 13' the lever 11 is oscillated around its pivot 16 which is stationary, and the lever 10 is thereby oscillated around its point of connection with the tie 13 which is tensioned; therefore the rod 5 is shifted longitudinally against the action of the spring 6 and the gear 4—3—3'—1—1'—2—22—21 are carried in a position so that the brakes are released.

The same operation is obtained when a pull is exerted on the tie 13, because in this case the lever 10 oscillates around the pivot 12 which is held stationary the lever 11 being held stationary by the tie 13' which is tensioned, and thus the rod 5 is shifted and the brakes are released in the same manner.

As above described the ties 13 or 13' are intended to be connected with the hand lever 24 arranged on the tractor and intended to control the tractor brakes; this lever must be so arranged that in its normal or released-brake position it exerts a pull on either of said ties connected with it and holds the associate eye 14—14' removed from the trailer frame. Therefore the brakes of the trailer are held released during the train running and when said hand lever is operated to apply the brakes of the tractor wheels, the tie 13 or 13' connected with it is released and thus the trailer brakes are also applied.

When it is desired to hold the trailer brakes released independent of the operation of the tractor controlling lever, the hand wheel 20 is operated so as to shift towards right hand the inner end of the tie 17. Then the pivot 16 is moved with the part 8—9 and the lever 11 is oscillated around its pivoting point with the tie 13', so that the rod 5 and the support 8—9 are moved bodily towards the right; then the pressure of the spring 6 on the flange 7 of the spindle 5 is released and the brakes are also released.

The same manipulation allows also of adjusting the braking pressure exerted by said spring on the associate parts.

By the gear according to this invention the brakes of the trailer are immediately applied as soon as the tie 13 or 13' connected with the tractor brake controlling lever is released; therefore the trailer brakes are applied when said lever is operated to apply the tractor brakes. Similarly it will be seen that when the pull of the tractor on the trailer is removed, as when the train descends a slope or the coupling between the tractor and trailer is broken, then the brakes on the trailer are automatically applied.

In this device the trailer brakes are forced towards their braking position by a member (spring 6) which is located in the trailer and acts directly on the brake operating gear; therefore the operation of the brakes is obtained in a very quick and efficient manner.

What I claim as my invention and desire to secure by United States Letters Patent is:—

1. A brake gear for trailers comprising means for actuating the brakes, a support adjustably mounted on the trailer frame, a rod connected with said brake actuating means and freely engaged in said support, a spring in said support acting on said rod to hold said brakes applied, an arm pivotally connected with said support and engaging said rod, a member connecting said arm with a tractor part, said connecting member and arm cooperating to hold said brakes released as long as a pull acts on said connecting member, and hand operated means for shifting said support and releasing the tension of said spring and said brakes.

2. A brake gear for trailers comprising means for actuating the brakes, a support mounted on the trailer frame, a rod connected with the said brake actuating means and freely engaged in said support, a spring in said support acting on said rod to hold said brakes applied, an arm pivoted at an intermediate point in said support, a second arm engaging said rod at an intermediate point of the same arm and having one end pivoted to the first named arm, members each connected with the free end of one of said arms and adapted to be connected with a tractor part, each of said connecting members and associate arms cooperating to hold said brakes released as long as a pull acts on said connecting means.

3. A brake gear for trailers comprising means for actuating the brakes, a support mounted on the trailer frame, in an adjustable manner, a rod connected with said brake actuating means and freely engaged in said support, a spring in said support acting on said rod to hold said brakes applied, an arm pivoted at an intermediate point in said support, a second arm engaging said rod at an intermediate point of the same arm and having one end pivoted to the first named arm, members each connected with the free end of one of said arms, and adapted to be connected with a tractor part, each of said connecting members and associate arms cooperating to hold said brakes released as long as a pull acts on it, and hand operated means for shifting said support and releasing the tension of said spring and the brakes.

4. A brake gear for trailers comprising means for actuating the brakes, a support mounted on the trailer frame, a rod connected with said brake actuating means and freely engaged in said support, a spring in said support acting on said rod to hold said brakes applied, an arm pivoted at an intermediate point in said support, a second arm engaging said rod at an intermediate point of the same arm and having one end pivoted to the first named arm, members each connected with the free end of one of said arms and adapted to be connected with a tractor part, each of these members having a part adapted to be connected with a tractor part and abutting against a part of the trailer frame to hold said connecting members tensioned, and each of said connecting members and associate arms cooperating to hold said brakes released as long as a pull acts on it.

5. A brake gear for trailers comprising means for actuating the brakes, a support mounted on the trailer frame, in an adjustable manner, a rod connected with said brake actuating means and freely engaged in said support, a spring in said support acting on said rod to hold said brakes applied, an arm pivoted at an intermediate point in said support, a second arm engaging said rod at an intermediate point of the same arm and having one end pivoted to the first named arm, members each connected with the free end of one of said arms and adapted to be connected with a tractor part, each of these members having a part adapted to be connected with a tractor part and abutting against a part of the trailer frame to hold said connecting members tensioned and each of said connecting members and associate arms cooperating to hold said brakes released as long as a pull acts on it, and hand operated means for shifting said support and releasing the tension of said spring and the brakes.

6. A brake gear for trailers comprising means for actuating the brakes, a spindle mounted to move endwise in the trailer frame this spindle being prevented from rotating and having a screw-threaded portion, a screw-threaded sleeve engaging said screw-threaded portion of said spindle, means for manipulating said sleeve, a support connected with said spindle, a rod connected with said brake actuating means and freely engaged in said support, a spring in said support acting on said rod to hold said brakes applied, an arm pivoted at an intermediate point in said support, a second arm engaging said rod at an intermediate point of the same arm and having one end pivoted to the first named arm, members each connected with the free end of one of said arms and adapted to be connected with a tractor part, each of said connecting members and associate arms cooperating to hold said brakes released as long as a pull acts on it.

Signed at Turin, Italy, this 29 day of Mar., 1921.

ACHILLE ARATO.